J. C. RITCHEY AND F. G. WILLIAMS.
ELECTRIC WELDING TOOL.
APPLICATION FILED APR. 17, 1920.
1,359,620.
Patented Nov. 23, 1920.
2 SHEETS—SHEET 2.
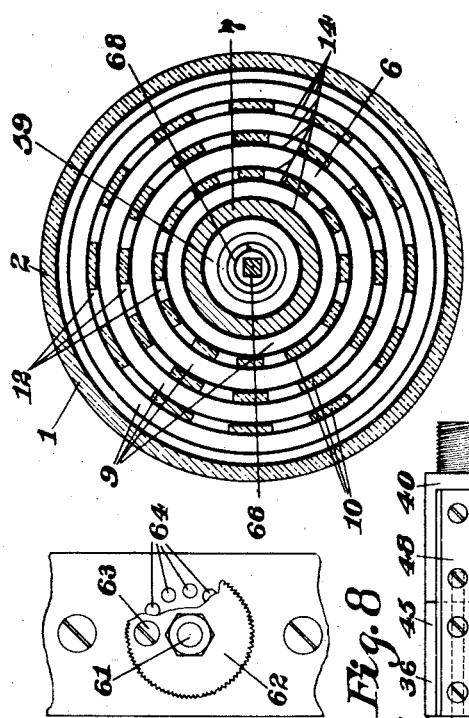
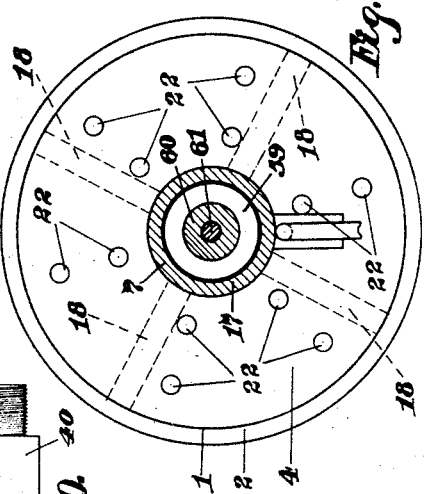
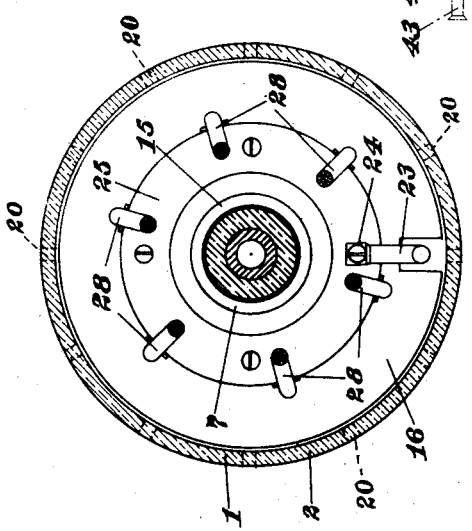
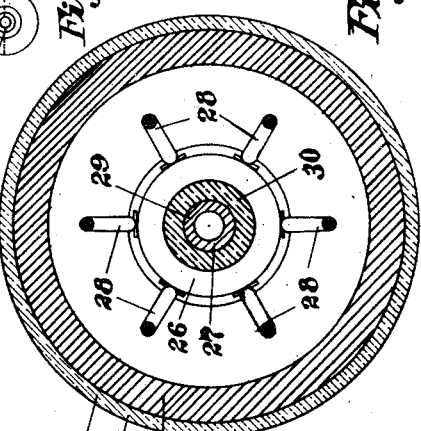
Witnesses
E. S. Utler
Edythe Lamb
Inventor
John C. Ritchey
Farrell G. Williams
By
Attorney

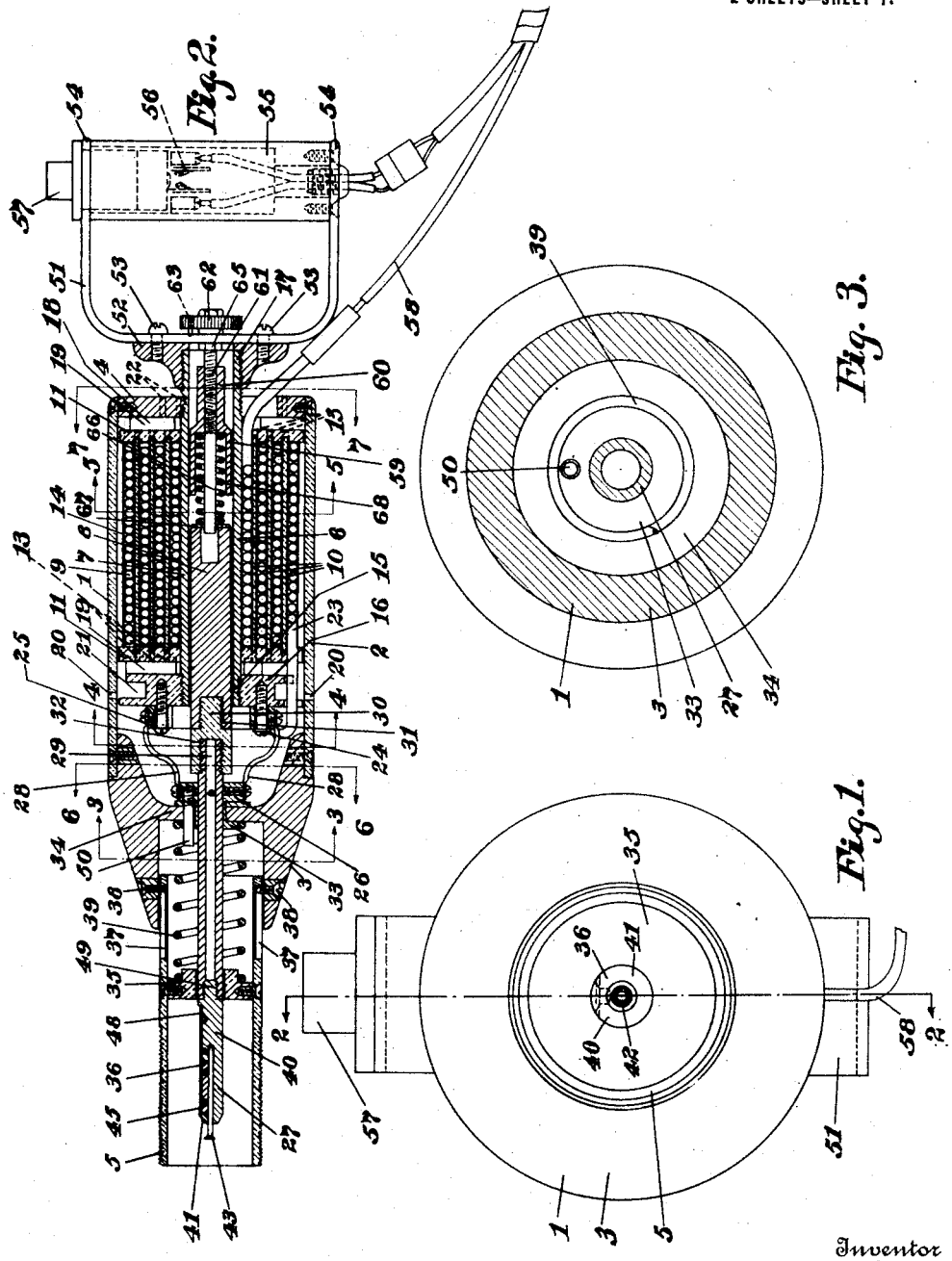

UNITED STATES PATENT OFFICE.

JOHN C. RITCHEY AND FERRELL G. WILLIAMS, OF BELLEVUE, PENNSYLVANIA.

ELECTRIC WELDING-TOOL.

1,359,620.  Specification of Letters Patent.  Patented Nov. 23, 1920.

Application filed April 17, 1920. Serial No. 374,518.

*To all whom it may concern:*

Be it known that we, JOHN C. RITCHEY and FERRELL G. WILLIAMS, citizens of the United States, residing in Bellevue, in the county of Allegheny and State of Pennsylvania, have invented certain new and useful Improvements in Electric Welding-Tools, of which the following is a specification.

This invention relates to electric welding tools and more particularly to that type of tool adapted to hold material to be welded to other material.

An object of the invention is to provide an electric welding tool by which an electric arc is automatically drawn between material held by the tool and material to which the first mentioned material is to be welded.

Another object of the invention is to provide an electric welding tool by which material held by the tool may be moved automatically a predetermined distance away from other material to which it is to be welded to draw a suitable electric arc between such materials and by which the material held by the tool and heated by the arc may be automatically moved into contact with the other material to cause such materials to weld together.

Another object of the invention is to provide an electric welding tool with means for protecting the eyes and hands of an operator, as well as other nearby workmen, from the bright light and heat of the welding arc.

Another object of the invention is to provide an electric welding tool with an adjustable stop device by means of which the length of an arc to be drawn between materials to be welded together, may be increased or decreased.

A further object of the invention is to provide an electric welding tool which, as described, is automatically cooled by air.

A still further object of the invention is to provide an electrical welding tool having a novel material holding terminal.

These and other objects will be apparent from the following description.

Referring now in detail to the drawings in which like reference characters refer to like parts, Figure 1, is an end elevational view of an electric welding tool constructed in accordance with the invention; Fig. 2 is a longitudinal sectional view of the same taken on the line 2—2 of Fig. 1 such view being reduced in size; and Figs. 3, 4, 5, 6 and 7 are enlarged cross sectional views taken on the lines 3—3, 4—4, 5—5, 6—6, and 7—7 respectively of Fig. 2. Fig. 8 is a detail view of a portion of the device for adjusting the stop member, and Figs. 9, 10 and 11 are top side and end views respectively of the terminal portion of the tool.

Referring now in detail to the drawings, the reference character 1 indicates the casing of the welding tool which casing is made from any suitable material that will not conduct electricity. This casing may be made of any suitable form but as illustrated in the drawings preferably comprises an annular body portion 2 having end portions 3 and 4 secured thereto, and also comprises a tubular portion 5 which is slidably connected with the end portion 3.

Within the portion 2 of the casing an electromagnet 6, preferably of the solenoid type is arranged. This electromagnet comprises a hollow member 7 which is preferably made of brass, a member 8 which is preferably made of soft annealed iron and is movable back and forth in the member 7, and further comprises a coil 9 of suitable wire with insulation which is wound around the member 7 in a sufficient number of layers, each layer of wire being separated from an adjacent layer by insulating spacing strips 10, the ends of such strips being mounted in members 11 which are arranged one at each end of the coil 9. The strips 10 between each layer of wire are preferably spaced apart throughout the coil, the spaces between the strips forming longitudinal ducts 12 through which air may freely circulate. The members 11 are each provided with openings 13 which are located between the strips 10 of each layer and are adapted to permit the free circulation of air therethrough. Between each layer of wire and the adjacent strips 10, and between the first layer of wire and the member 7 an insulating medium 14 is provided which may be of any suitable material but in the present embodiment of the invention is preferably varnished cambric.

The end portion 15 of the member 7 preferably extends through and beyond the member 11 at one end of the coil 9 and is provided with a member 16 made from any suitable insulating material and is preferably of annular form, which member is secured to the member 7 through the medium of screw threads or any other suitable means. The end portion 17 of the member 7 preferably extends through and beyond the member 11 at the opposite end of the coil 9 and through and beyond the casing member 4, such casing member being secured to the member 7 through the medium of screw threads or any other suitable means. Between the member 11 and member 16 at one end of the coil 9 and between the member 11 and the casing member 4 at the opposite end of the coil 9 spacing members 18 are provided which are adapted to retain the coil 9, and members 11 in their proper relative positions and at the same time provide spaces 19 at the ends of the coil through which air may pass freely. The body portion 2 of the casing is provided with a plurality of perforations 20 through which air may freely pass to and from the space 19 at one end of the coil 9, there being a notch 21 formed in the member 16 which is adapted to hold any dirt that may fall through the openings 20 and in a measure prevent such dirt from entering the coil 9. The casing member 4 is provided with a plurality of perforations 22 which lead to the space 19 at the other end of the coil 9, through which openings air to and from such space may pass freely. It will be noted that the air heated by the coil will escape through the openings 13 into the spaces 19 and from such spaces through the perforations 20 and 22 of the parts 2 and 4 respectively of the casing. It will be noted from the foregoing that as the heated air escapes from the casing that cool air will be drawn into the casing and coil and will thus keep the casing and electromagnet as a whole compartively cool.

The end portion 23 of the wire from which the coil 9 is formed extends through the member 11 at one end of the coil and through the member 16 at the other end of the coil, and as indicated by the reference character 24, is secured to a ring 25 which ring is secured to the member 16. This ring 25 is in turn electrically connected with a ring 26 which is electrically connected with the welding member 27 of the tool. The electrical connection between the ring 25 and ring 26 being preferably made through the medium of a plurality of flexible electric wires 28, one end of each wire being secured to the ring 25 and the opposite end being secured to the ring 26. Both of these rings are made of any material having the proper electrical conducting properties and their use is to assist in conducting the electric current from the coil 9 to the welding member 27 and to distribute the current from the large coil wire to the smaller and more flexible wires. It will however be understood that these rings 25 and 26 and wires 28 may be omitted and any other suitable connection directly from the coil 9 to welding member 27 may be substituted.

The inner end portion 29 of the welding member 27 is connected with one of the end portions of the movable member 8 by a coupling 30 which is made of any preferred non-conducting material. This coupling is preferably provided with a screw threaded portion 31 which is screwed into a screw threaded socket formed in the member 8, and is further provided with a screw threaded socket 32 into which the screw threaded portion of the welding member 27 is screwed, thus securing the welding member 27 and the member 8 together and at the same time insulating one from the other. This welding member 27 extends through a bushing 33 which is secured to a portion 34 of the casing member 3, and also extends through a guide member 35 which is secured to the casing member 5 and at its outer end comprises a terminal portion 36. It will be noted that the welding member 27 is movable relative to the bushing 33 and guide member 35 and that the casing member 5 and the guide member 35 are movable relative to the member 27.

The casing member 5 is provided with longitudinally disposed grooves 37 with which screws 38 or any other suitable means in the casing member 3 are adapted to loosely engage to permit free longitudinal movement of the casing members 5 and 3 relative to each other. Between the casing members 3 and 5 a spring 39 is provided, one end of which is seated on the guide member 35 and the opposite end is seated on the portion 34 of the casing member 3, which spring is adapted to force the casing member 5 outwardly from the casing member 3 to a position as shown in Fig. 1 of the drawings, and to provide suitable resistance to the operator's pressure required to hold the entire tool in contact with the sheathing.

The terminal 36 of the member 27 comprises a body portion 40 which is provided with an unbroken end portion 41 having an opening 42 formed therein for the reception of a nail 43 or any other material. Back of this end portion 41 a notch 44 is provided in which a clamping member 45 is adapted to seat. The notched portion of the body 40 is provided with a groove 46 and the clamping member 45 is provided with a groove 47, which are so shaped that, when the clamping member is in its proper position in the notch 44 they form a longitudinal opening for the reception of the nail 43 or other material, which opening will substantially register with the opening 42 in the end portion 41. As illustrated in the drawings this longitudinal opening is preferably extended inwardly beyond the clamping member 45 and it will be seen that when the nail is in its proper position in the longitudinal opening it will engage the metal forming this portion of the opening and will also to some extent engage the metal forming the opening 42 in the end portion 41 and will thus prevent any accidental movement of the nail relative to the terminal, and will insure the required electrical contact between the nail and the terminal. To hold the clamping member 45 in its proper position in the notch 44 and to insure a close contact between the member 45 and the nail 43, a spring 48 is provided, one end of which is secured to the body portion 40 and the opposite end to the clamping member 45 and is adapted to exert pressure inwardly on this member at all times. The inner end 49 of this terminal is secured to the remainder of the member 27 through the medium of screw threads or any other suitable means. The member 27 has been illustrated in the drawings and described hereinbefore as comprising a plurality of connected parts but it is to be understood that this member may comprise a single integral member. The terminal 36 has been hereinbefore described as being adapted to receive a nail or wire but it is to be understood that such terminal may be made of a form to hold material of any other shape.

To prevent rotary movement of the member 27 relative to the casing, a pin 50 is provided, one end of which is secured to the ring 26 and the other end is extended through the bushing 33 and engages therewith and by reason of this engagement the member 27 is held in its proper position at all times. This pin is mounted in the bushing 33 in such a manner that it is movable longitudinally relative thereto thus permitting the member 27 to move longitudinally.

The end portion 17 of the member 7 is provided with a handle portion which is secured to the tool in any suitable manner. This handle preferably comprises a yoke 51 which is secured to the end 17 of the member 7 by a member 52 and screws 53. Between the outer ends 54 of the yoke a hand portion 55 is provided in which a suitable electrical switch 56 is mounted, such switch being operable by means of a push button 57. By means of this switch, a switch (not shown) remote from the tool is adapted to be controlled, such remotely controlled switch and coil 9 being electrically connected by a wire 58.

Within the end portion 17 of the member 7 a stop member 59 is provided with which one end of the member 8 is adapted to engage, and by such engagement the movement of the member 8 is limited. The end portion 60 of this member is provided with screw threads with which the screw threads formed on a rotatable member 61 are adapted to operatively engage. The outer end of this member is provided with a thumb nut 62 by means of which the member may be rotated, such nut having a screw member 63 mounted therein adapted to be moved into and out of engagement with perforations or indentations 64 in the yoke 51. The underside of the thumb nut engages one surface of the yoke 51 and prevents longitudinal movement of the member 61 in one direction, longitudinal movement in the opposite direction being prevented by a nut or collar 65 on the member which engages the opposite side of the yoke. When it is desired to adjust the travel of the member 8 the end of the member 63 is first raised out of one of the perforations 64, the thumb nut and member 61 are then rotated which causes the stop member 59 to move backward or forward upon the member 61 until the space between the stop member and the end of the member 8 has been increased or decreased a desired amount at which time the screw member 63 is lowered again into one of the perforations 64 thus locking the thumb nut 62 against accidental rotation and holding the stop member in its preferred adjusted position. The stop member 59 is provided with a pin 66 which is rigidly secured to such member and is preferably angular in cross section. One end of this pin passes through an opening formed in a washer 67 which is secured to the end of the member 8. This opening is of substantially the same shape as the pin 66 and of slightly greater dimensions so that the pin by its engagement with the washer will be kept from turning thus preventing the stop member from rotating when the member 61 is rotated and at the same time permits the stop member to move back or forth when it is being adjusted. It will be understood that instead of using the stop member and mechanism for operating it just described and illustrated in the drawings any other suitable device may be used which performs the same function.

Between the member 8 and the stop member 59 a spring 68 is interposed which is adapted to force the members 8 and 27 to their proper position as illustrated in Fig. 1 of the drawings. This spring is coiled around the pin 66 and is held in its proper position by this pin, and one end of the spring is seated on the washer 67 on the end of the member 8 while the other end is seated in the stop member 59.

The tool is electrically connected to one side of the line of an electrical source of supply while the article to which another article is to be welded is connected to the other side of the electrical supply line. The source of supply and connections have not been illustrated in the drawings as these devices are well known in the art.

When it is desired to weld one metallic article to another article such as a nail to the metallic sheathing of a railway car with the tool hereinbefore described, the operator inserts the nail 43 in the opening formed in the terminal 40 and then takes hold of the hand portion 55 of the handle with one hand and the casing member 5 with the other hand. The casing member 5 is then drawn back a sufficient distance for the operator to see the head of the nail thus facilitating the placing of such head in contact with the sheathing on the spot that the nail is to be welded. The casing member is now released until it also contacts with the sheathing then the nail is drawn away from the sheathing a short distance after which it is again advanced toward the sheathing until the head contacts again with the sheathing at which time the operator presses the push button 57 of the switch 56 which closes the electrical control circuit causing a switch remote from the tool to close the electrical welding circuit from the electrical source of supply to the tool. This last mentioned circuit extends from the source of electrical supply through the remotely controlled switch thence through the wire 58, coil 9, ring 25, flexible connectors 28, ring 26, member 27, terminal 36, and nail 43, to the material to which the nail is to be welded and then to the electrical source of supply by any suitable connections. When the remote switch is closed and the nail 43 is in contact with the sheathing the electric current passes through the circuit just described, which energizes the electromagnet causing the members 8 and 27 and the nail to be moved in a direction away from the sheathing, the movement of the member 8 causing the spring 68 to be compressed. As the nail 43 is drawn away from the sheathing an electric arc is struck between the head of the nail and the sheathing which arc heats the head of the nail and the sheathing at the spot to which the nail is to be welded, to a welding heat. As soon as the desired arc is drawn the operator releases the pressure on the push button 57 which causes the remotely controlled switch to break the circuit to the tool and at this time as there is no electric current passing through the coil 9, the electromagnet is no longer energized and the spring 68 forces the members 8 and 27 toward the sheathing and the nail 43 against the sheathing and the weld is made. In some cases it may be found expedient to push the tool as a whole toward the sheathing thus bringing the nail in close contact with the sheathing during the heating period. After the weld is made the operator draws the tool away from the nail and as he does this the spring 39 which has been compressed forces the casing member outwardly to its normal position of rest. It will here be noted that the casing member 5, when a weld is being made, protects the operator's eyes from the strong light of the arc, and also protects his hands from the heat thereof, and further protects the eyes and bodies of nearby workmen from the light of the arc. It will here be noted that by the use of the hereinbefore described stop member the arc drawn between articles to be welded together, may be readily lengthened or shortened. The operation of the tool as just described is the preferred operation and it will be seen that this operation may be altered in various ways.

It will be understood that many changes may be made in the arrangement and details of the parts of the tool without departing from the spirit and scope of the invention.

Having thus described the invention what we claim as new and desire to secure by Letters Patent is:—

1. In an electric welding tool, a member for loosely holding material to be welded to other material, and means for automatically moving said member, the metal held by said member being adapted to be withdrawn therefrom when the first mentioned metal is connected with the second mentioned metal.

2. In an electric welding tool a member for loosely holding a metallic object to be welded to another metallic object, and electromagnetic means for moving said member, the metal held by said member being adapted to be withdrawn therefrom when the first mentioned metal is connected with the second mentioned metal.

3. In an electric welding tool, a longitudinally movable member for holding a metallic object to be welded to another metallic object, and electromagnetic means for moving longitudinally of the tool said member and first mentioned object, and a flexible electric connection between said electromagnet and member.

4. In an electric welding tool, a member for holding a metallic object to be welded to another metallic object, means for causing said member and first mentioned object to move away from the second mentioned object when an electric current is applied, to strike an electric arc between said objects.

5. In an electric welding tool, a member for holding a metallic object to be welded to another metallic object, means for causing said member and first mentioned object to move longitudinally of the tool away from the second mentioned object when an electric current is applied to strike an electric arc between said objects, and means for adjusting the movement of said object.

6. In an electric welding tool, a member for holding a metallic object to be welded to another metallic object, means for automatically moving said member, and a casing substantially inclosing said member and means, one portion of said casing being movable relative to the remainder of said casing and relative to said member.

7. In an electric welding tool, a solenoid coil comprising a plurality of layers of wire, spacers between said layers, said spacers being spaced apart from each other to form air ducts through said coil, a casing for said tool inclosing said coil and having openings formed therein communicating with said ducts for permitting circulation of air through said coil and casing.

8. In an electric welding tool, a member for holding material to be welded to other material, magnetic means for automatically moving said member and first mentioned material away from the second mentioned material, an adjustable stop member for limiting the movement of said member, and means for holding said stop member in preferred adjusted position.

9. In an electric welding tool, a member for holding material to be welded to other material, and means for automatically moving said member and first mentioned material back and forth in a direction longitudinally of the tool and relative to the second mentioned material.

10. In an electric welding tool, a member for holding material to be welded to other material, means for moving the member and first mentioned material longitudinally of the tool and away from the second mentioned material, and means other than the first mentioned means for moving said member and material toward the second mentioned material.

11. In an electric welding tool, a member for holding material to be welded to other material, electrically operated means for moving the first mentioned material longitudinally of the tool away from the second mentioned material, and means other than the first mentioned means for moving the first mentioned material longitudinally of the tool toward the second mentioned material.

12. In an electric welding tool, a member for holding material to be welded to other material, electrical connections to said member, means for automatically drawing an arc between said materials when an elastic current is applied to said tools and means for moving the first mentioned material into engagement with the second mentioned material when the current is cut off, to weld said materials together.

13. In an electric welding tool, a casing, a solenoid in said casing, a member in said casing movable by said solenoid, and means on said member adapted to engage said casing to prevent said member from rotating in said casing.

14. In an electric welding tool, an electromagnet, a member for holding material to be welded to other material and a casing surrounding said electromagnet and member, one portion of said casing being movable relative to the other portion of said casing and movable relative to said member.

15. In an electric welding tool, a member for holding material to be welded to other material, said member being movable to draw an electric arc between said materials, and a casing for said tool having a movable portion adapted to cover the arc between said materials.

16. In an electric welding tool, a member for holding material to be welded to other material, means for moving said member, a casing for said tool surrounding said member and means, said casing having a portion adapted to be moved to a position that it will cover the first mentioned material and the spot on the second mentioned material to which the first mentioned material is to be welded.

17. In an electric welding tool, means for drawing an arc between two objects to be welded together, and a casing member for said tool having an automatically adjustable portion adapted to cover said arc.

18. In an electric welding tool, a solenoid coil having air ducts formed therein, a casing for said tool inclosing said coil, said casing having an opening formed therein communicating with said ducts for permitting circulation of air through said coil and casing, and means between said coil and casing for preventing dirt from entering said coil.

19. In an electric welding tool, a terminal having an unbroken end portion, said terminal having a notch formed therein back of said end portion, a member adapted to seat in said notch and means for holding said member in said notch.

20. In an electric welding tool, a terminal having an unbroken end portion, said end portion having an opening formed therein, a member adapted to seat in a notch formed in said terminal back of said end portion, said member and notched portion of said terminal having grooves formed therein, adapted to form an opening which will register with the opening in said end portion, said opening being adapted to receive material to be welded, and means for holding said member in contact with said material.

21. In an electric arc welding tool, an automatically adjustable shield for inclosing the electric arc.

22. The combination with an electric welding tool, capable of drawing an electric arc, of means carried by said tool and movable relative thereto for inclosing said arc to confine the rays thereof.

In testimony whereof we affix our signatures in the presence of two witnesses.

JOHN C. RITCHEY.
FERRELL G. WILLIAMS.

Witnesses:
 EDYTHE LAMBE,
 E. S. UTZLER.